United States Patent
Friedewald et al.

[19]

[11] Patent Number: 6,059,355
[45] Date of Patent: May 9, 2000

[54] MOTOR VEHICLE WITH SAFETY BODY STRUCTURE ARRANGEMENT

[75] Inventors: Klaus Friedewald; Gert Heumann, both of Braunschweig; Arnold Ensslen, Wolfsburg, all of Germany

[73] Assignee: Volkswagen AG, Wolfsburg, Germany

[21] Appl. No.: 09/310,750

[22] Filed: May 13, 1999

Related U.S. Application Data

[63] Continuation of application No. PCT/EP97/05833, Oct. 22, 1997.

[30] Foreign Application Priority Data

Nov. 14, 1996 [DE] Germany .......................... 196 46 999

[51] Int. Cl.⁷ ....................................................... B60J 5/04
[52] U.S. Cl. ......................... 296/189; 296/146.11; 403/2; 16/222
[58] Field of Search ............................. 296/146.11, 189, 296/202; 16/222, 387; 403/2

[56] References Cited

U.S. PATENT DOCUMENTS 3,643,755  2/1972  Gionet et al. .......................... 16/222 X
5,842,735  12/1998  Makino et al. ................. 296/146.11 X
5,906,410  5/1999  Dalinkiewicz ........................... 296/189

FOREIGN PATENT DOCUMENTS 2291885  of 0000  France .
2701994  9/1994  France ............................. 296/146.11
1444790  of 0000  United Kingdom .
2144797  of 0000  United Kingdom .

*Primary Examiner*—Dennis H. Pedder
*Attorney, Agent, or Firm*—Baker Botts L.L.P.

[57] ABSTRACT

A motor vehicle has a safety body structure and side doors, each side being fixed to a door pillar of the safety body structure by at least one door hinge. When the vehicle receives a frontal impact, the forces which are imparted to the front section of the safety body structure are transmitted to the door pillar and are transmitted by the door to other body parts further away from the point of impact when the side door remains closed or is supported against the door pillar in the area of the door hinge without swinging outwardly. In order to prevent the front end of the door from swinging outwardly, the front end is caused to move, upon frontal impact to the vehicle, parallel to or inwardly toward a longitudinal center line of the vehicle by a controlled orientation of the deformation of a door hinge part in relation to the door pillar.

3 Claims, 5 Drawing Sheets

MOTOR VEHICLE WITH SAFETY BODY STRUCTURE ARRANGEMENT

REFERENCE TO RELATED APPLICATION

This application is a continuation of International Application No. PCT/EP97/05833 filed Oct. 22, 1997.

BACKGROUND OF THE INVENTION

This invention relates to motor vehicles having safely body structure arrangements by which collision impact forces are transmitted through vehicle door pillars and doors.

In motor vehicles with safety body structures such as have been in use for several decades, efforts are made to keep the passenger compartment largely free of deformation even in severe accidents. In order to achieve this objective when the vehicle is involved in a frontal or offset collision, the front section of such conventional motor vehicles is arranged so that it deforms during an impact while converting kinetic energy to deformation work, and some of the impact forces are transmitted rearwardly to more remote regions of the vehicle by longitudinal members and reinforced side walls of the passenger compartment. In the more remote rear regions the transmitted impact forces are absorbed over large areas and through plastic deformation of the body material.

However, this result is only ensured to an adequate degree if the side doors of the vehicle remain in a closed position during the collision, since otherwise only a portion of the impact forces acting on a front door pillar will be transmitted through the structure above and below the door rearwardly to a door pillar located behind it for absorption in the rear regions of the vehicle. Possible weak points of the doors in this respect include the region of the door lock and the region of the door hinges, which usually deform at their point of attachment or tear out of the door pillar because of inertia when the doors are pushed forward in a frontal or offset collision and because the door pillar may deform rearwardly as a result of the impact forces.

In conventional door hinge arrangements as shown by way of example in FIGS. 6a and 6b, deformation of the door pillar or tearing out of a hinge retaining part welded to the door pillar results first in interruption of the transmission of force through the door hinge itself, and then results in the front part of the door attached to the door hinge being pushed outwardly because the weld seam located between the hinge retaining part and the door pillar tears, starting at its rearward end, and the hinge retaining part is bent outward in the process. This causes the front end of the door to swing out of the door opening toward the side and away from the longitudinal center line of the vehicle so that it can no longer bear against the adjacent door pillar even above and below the door hinges or in the area ahead of the window in the door. This means, in turn, that the chain of force-transmitting components such as door pillars and door beams is broken, causing more severe deformation of the passenger compartment to occur in the front section of the vehicle in an undesirable manner.

In the arrangement described in British Patent Application No. 2,144,797, this disadvantage is avoided by providing a hinge component that is rigidly attached to the door pillar and has two parts which are connected by an additional pin extending parallel to the conventional hinge pin and which, in normal vehicle operation, is rigidly connected by a shear pin to both parts of this hinge component. The shear pin provides an intended deformation point that is destroyed when the vehicle is involved in a collision so as to release the two parts of the hinge component attached to the pillar, permitting them to swivel relative to each other. This swivel movement causes a displacement of the hinge pin, and thus of the rear end of the door that is rigidly connected to it, toward the vehicle's longitudinal center line. In this way, the arrangement assures that the above-described chain of force transmitting components is preserved in a collision.

SUMMARY OF THE INVENTION

Accordingly, it is an object of the present invention to provide a safety body structure arrangement for a motor vehicle that overcomes disadvantages of the prior art.

Another object of the invention is to provide a motor vehicle having a safety body structure arrangement in which displacement of a door hinge pin toward the vehicle axis during an impact is assured without the expense of an additional shear pin, which requires critical matching, while nevertheless preserving its advantage.

These and other objects of the invention are attained by providing a safety structure body arrangement for a vehicle in which a vehicle door hinge part is provided with a region designed for deformation in response to an impact and which upon deformation causes the door to be displaced toward the longitudinal center line of the vehicle.

In accordance with the invention, therefore, an intended deformation point is integrated into constituents of a door hinge that already exist. In one arrangement, a slot guide is provided for the door hinge pin which is designed so that it moves the hinge pin, and thus the front door region connected thereto, in the direction of the vehicle's longitudinal axis in the event of a collision.

The invention thus controls the deformation of the door hinge by appropriate design measures, in the simplest case by appropriate design of the door hinge itself, or by additional devices, in such a way that the front part of the door is retained in the door opening or pulled inwardly in the direction of the passenger compartment in response to an impact. As a result, adjacent surfaces of the door and the door pillar which face each other across a gap when the door is closed can be brought into contact so that the door can bear against the door pillar despite an interruption in the force transmission path in the region of the deformed or destroyed door hinge, and thus the chain of force transmitting components at the front of the door is preserved.

To provide improved control of the deformation of the door hinge under different impact conditions according to one preferred embodiment of the invention, at least one intended deformation point is located on the door hinge or in the vicinity of its attachment to the door and/or the door pillar. This assures that the door hinge always deforms permanently or breaks or tears out at this point, and furthermore through appropriate design permits control of the movement of the hinge parts adjacent to the intended deformation point on the door side and thus permits control of the motion of the front end of the door.

In order to make certain that a closed door can still be opened easily even after deformation of the hinge or hinge part, the intended deformation point is preferably located on a hinge retaining part or a hinge part that is rigidly mounted to the door pillar or in the region of a rigid connection, usually formed by weld seam, between the door pillar and the hinge part attached to the vehicle body, i.e. a "body hinge part". This assures that the door can still be rotated about the axis of the door hinge for opening, something that is not always possible when the intended deformation point is located in a hinge part attached to the door, i.e. a "door hinge part".

The intended deformation point on the body hinge part is preferably located on the opposite side from the door hinge part with respect to a longitudinal center line, i.e. it is located outside of the door pillar in a lateral direction with respect to the vehicle center line, between the door pillar and a hinge pin of the door hinge. Moreover, it is advisable for the intended deformation point to be formed by a reduction in cross section or a weakening of the material of the body hinge part at the location where the body hinge part folds or bends when an impact causes the door hinge to deform. In this way the reduction in cross section forms a rotational axis about which the remainder of the hinge, and with it the front part of the door, is swung inwardly in the direction toward the longitudinal center line of the vehicle.

Alternatively, the intended deformation point on the body hinge part can also be located in the region of a hinge pin receptacle, which, for example, can have at least one guide slot which is separated by a thin material bridge from a location hole of the hinge pin and which extends in the shape of an arch or at an acute angle to the longitudinal center line so that the hinge pin moves into the slot while approaching the longitudinal center line after an impact causes the thin material bridge to break. Instead of providing an intended break point formed by a material bridge, the hinge pin can also be press-fitted into a guide slot in which the space between opposing edges is smaller than the diameter of the hinge pin so that the hinge pin is forced along the guide slot while pushing apart the edges when an impact occurs.

The intended deformation point can also be located at a point where the body hinge part is attached to the door pillar. Since the body hinge part is normally welded to the door pillar, this means that the weld seam between the door pillar and the body hinge part must be positioned so that the front edge of the door is caused to move toward the longitudinal center line of the vehicle when a structural failure occurs in the hinge area. This motion toward the center line can be accomplished in accordance with a further advantageous embodiment of the invention in which a body hinge part or body hinge retaining part welded onto the door pillar has an angle section, with the hinge pin located in front of or laterally adjacent to the front end of a flange of the body hinge part welded to the door pillar. The flange thus provides the axis of rotation in case of structural failure, deformation, or opening of the weld seam. This can usefully be accomplished by welding the body hinge part flange to an angled, vertical surface of the door pillar which is inclined toward the longitudinal center line in the direction of vehicle travel at an angle of preferably greater than 45 degrees, and by coordinating both the angle between the two flanges and the length of the other flange which has the receptacle for the hinge pin with the angle of inclination of the angle surface.

Even though it is preferable for the front end of the door to move toward the vehicle longitudinal center line upon deformation of the door hinge or its attachment because this causes the adjacent surfaces of the door and door pillar to come into contact more quickly, it also adequate if the front part of the door is prevented from swinging outwardly, for example if the door moves in the direction of travel as a result of deformation of the door hinge upon impact and engages with a part of the body that blocks the front end of the door from moving outwardly.

Instead of the front end of the door moving toward the longitudinal center line or maintaining the same distance from the longitudinal center line by controlled deformation of the door hinge or its attachment, additional structural guide arrangements can be provided that result in appropriate movement of the front end of the door. In the simplest case, these are guide arrangements affixed to the door and/or to the door pillar which cause the front end of the door to be pulled inwardly and/or prevent it from swinging outwardly in the event of deformation of the door hinge or its attachment.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 3:
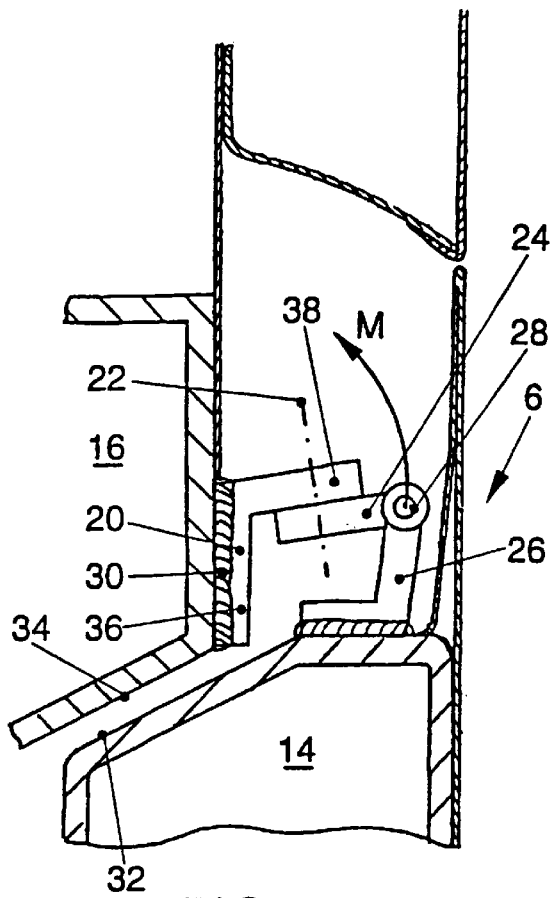
FIG. 3 is a top view corresponding to FIGS. 1 and 2 illustrating yet another door hinge arrangement in accordance with the invention.
Figure 4:
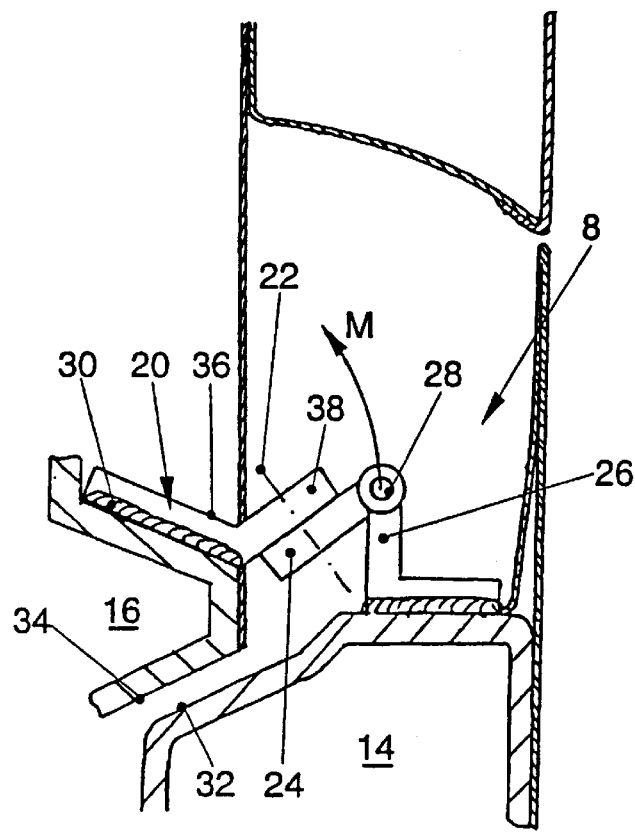
FIG. 4 is a top view corresponding to FIGS. 1 and 2 showing still another door hinge arranged in accordance with the invention.
Figure 5:
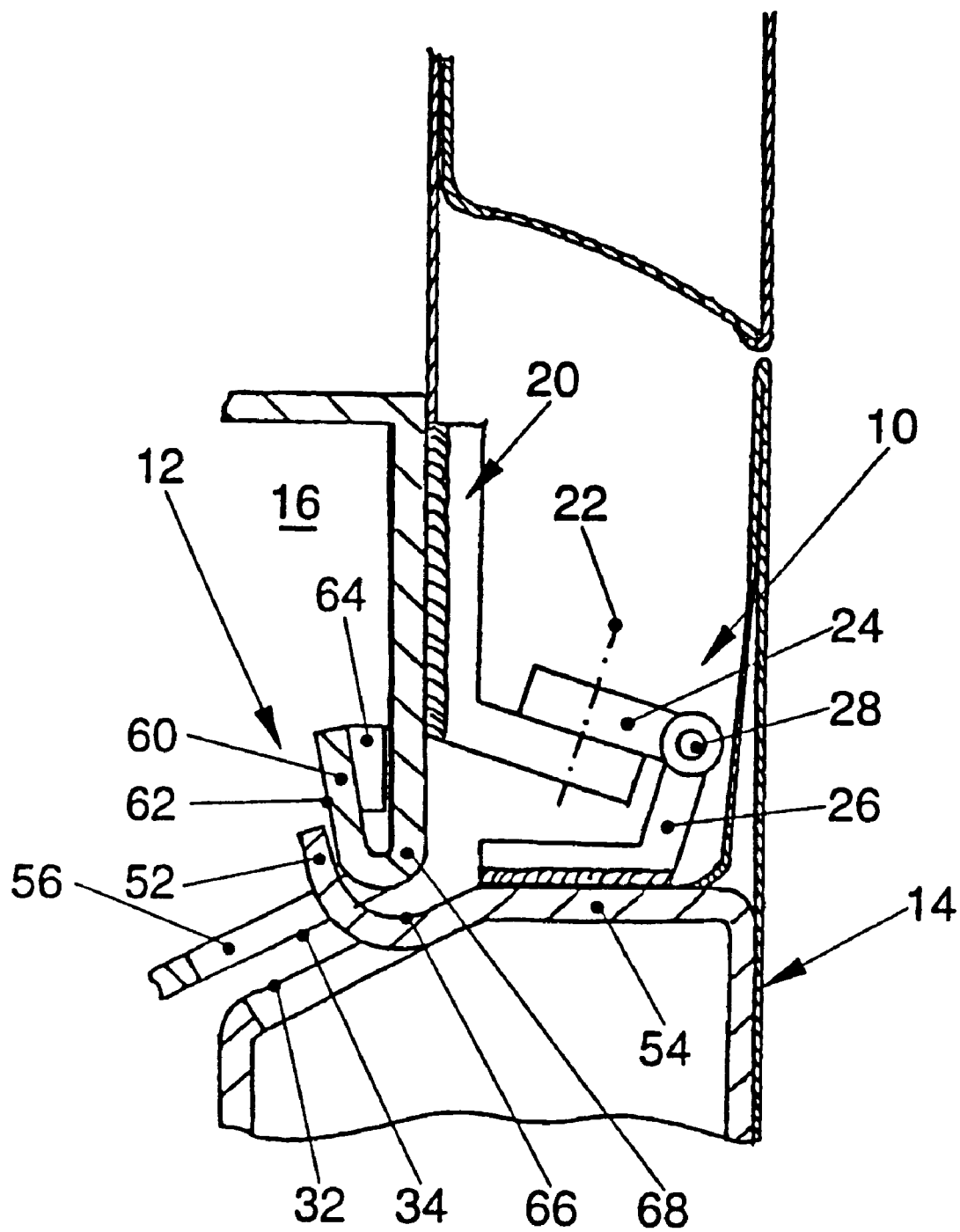
FIG. 5 is a partial cutaway top view of a door hinge arrangement having a guide device for a motor vehicle door in accordance with the invention that prevents the front end of the door from swinging out.
Figure 6A:
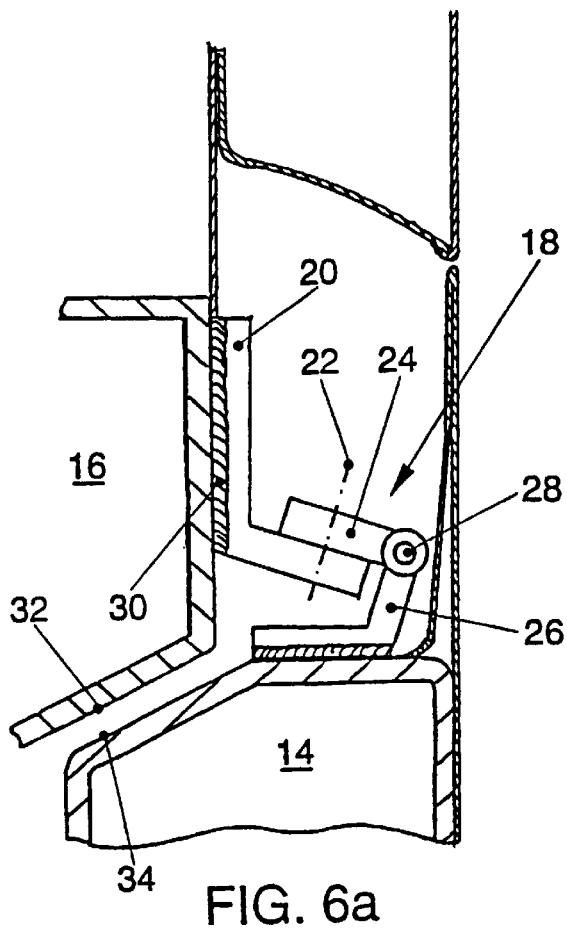
FIG. 6a is a partial cutaway top view showing a conventional door hinge.
Figure 6B:
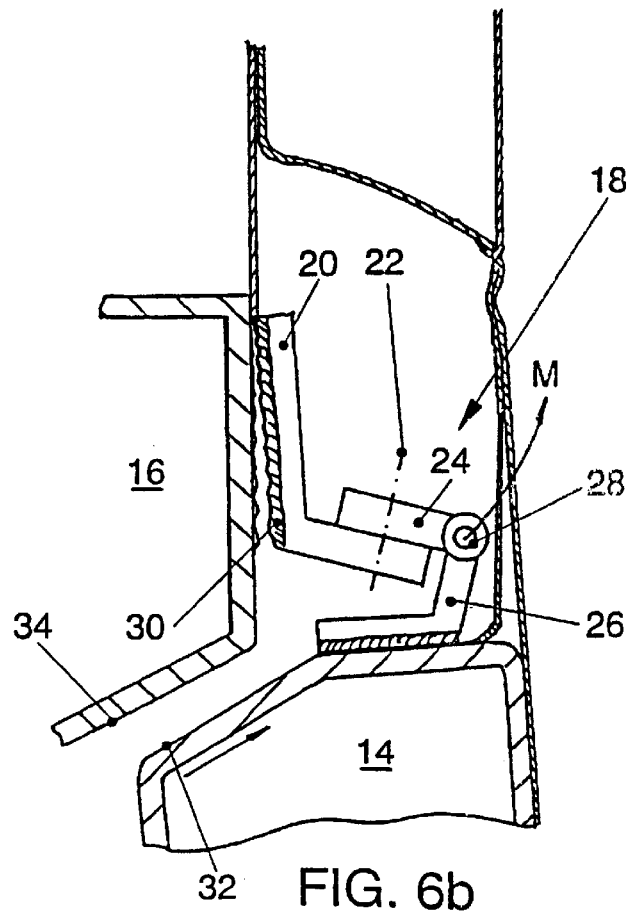
FIG. 6b is a partial cutaway top view of the door hinge showing FIG. 6a during deformation of the door hinge attachment.

In the typical embodiments of the invention represented by the door hinges 2, 4, 6 and 8 shown in FIGS. 1–4 and by the guide device 12 together with a door hinge 10 shown in FIG. 5, a door 14 that is attached at its front end to a door pillar 16 by a pair of the door hinges 2, 4, 6, 8 and 10 is prevented from swinging outwardly to the side of the vehicle in the case of a collision which causes deformation of the two door hinges 2, 4, 6, 8 and 10 or of their attachment as is illustrated with the conventional door hinge 18 shown in FIGS. 6a and 6b.

The conventional door hinge of FIG. 6a includes a hinge retaining part 20 having an angle body part section affixed to a door pillar 16 of the vehicle body, a hinge part 24 rigidly connected to the hinge retaining part 20 by a schematically illustrated off-center screw 22 along with a hinge door part 26 having an angle section welded to the door 14 and being rotatably connected to the hinge part 24 by a hinge pin 28 so that the door 14 can be opened and closed.

In a frontal collision or a so-called offset collision of the motor vehicle, the closed door 14, as a result of its inertia, exerts a force on the hinge pin 28 in the direction of vehicle motion and during deformation of the door pillar 16 in the rearward direction, that force can lead to damage or destruction of the door hinge 18 or its attachment to the pillar 16.

Usually, the door pillar 16 deforms or a weld seam 30 between the hinge retaining part 20 and the door pillar 16 tears open starting at its back end since the forces and moments are greatest there. As a result of the still existing attachment of the front end of the weld seam 30 to the pillar and the inertial forces acting on the door 14 as the weld seam 30 tears open, the hinge retaining part 20, and with it the rest of the door hinge 18 and the front part of the door 14, is swung outwardly and accelerated away from the vehicle's longitudinal center line about an axis of rotation located near the front end of the weld seam 30, as shown by the arrow M in FIG. 6b. This causes the front end of the door 14 to swing out to the side, while the adjacent angled surfaces 32 and 34 at the front end of the door 14 and on the door pillar 16 along the edge of the door opening, which face each other across a gap, move in the direction of the arrow P relative to each other so that they do not come into contact.

This means, on the one hand, that the forces acting between the door 14 and the door pillar 16 are thereafter transmitted only through the door hinge 18 so that the weld seam 30 very quickly tears completely open, and, on the other hand, that forces from the door pillar 16 cannot then be transmitted rearwardly to more remote regions of the vehicle either through the door hinge 18 or through the angled surfaces 32 and 34.

Figure 1A:
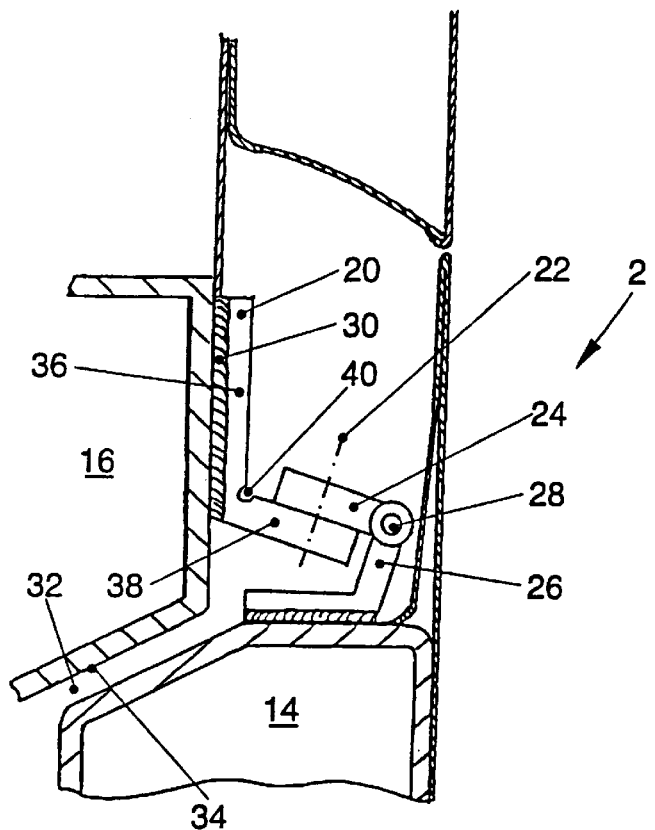
FIG. 1a is a partial cutaway top view showing a representative embodiment of a door hinge of a motor vehicle arranged in accordance with the invention with the door closed.
Figure 1B:
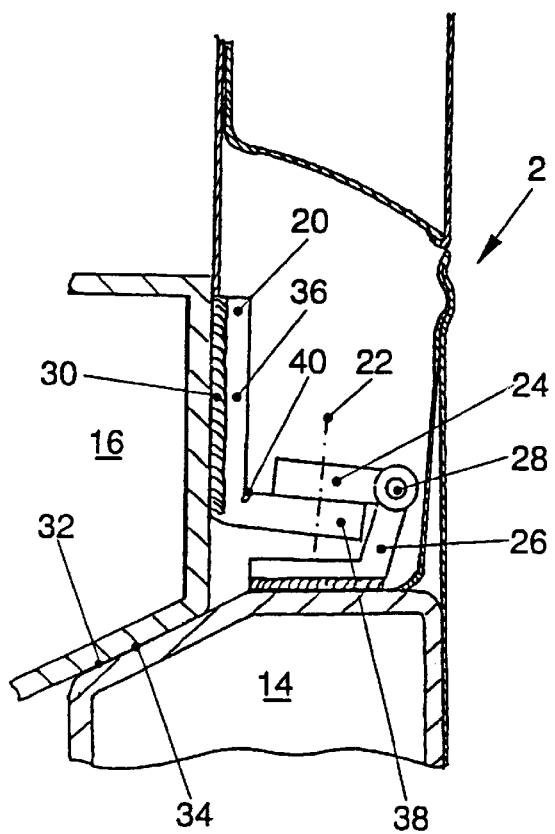
FIG. 1b is a partial cutaway top view of the door hinge of FIG. 1 after deformation of the door hinge.

The representative embodiment of a door hinge 2 in accordance with the invention, which is shown in FIGS. 1a and 1b, is constructed for the most part identically to the conventional door hinge 18, and like the conventional hinge it includes a hinge retaining part 20 having angled two flanges 36 and 38, with the flange 36 welded to the door pillar 16 and extending essentially parallel to the longitudinal center line of the vehicle. In contrast to the conventional door hinge 18 of FIGS. 6a and 6b, however, a groove 40, which extends over the full height of the hinge retaining part 20, is provided along the inside corner of the angle between the two flanges 36 and 38. The groove 40 constitutes an intended deformation point at which the hinge retaining part 20 is deformed before any tearing of the weld seam 30 can occur. During such deformation, the free flange 38 of the hinge retaining part 20 bends forward at the groove 40 and the hinge pin 28 moves essentially parallel to the direction of travel, so that the front end of the door 14 does not swing outwardly before the adjacent angled surfaces 32 and 34 on the front end of the door 14 and on the door pillar 16 come into contact in the manner shown in FIG. 1b. Thereafter, the surfaces 32 and 34 act as force transmitting surfaces through which the forces between the door pillar 16 and the door 14 are transmitted so that the door hinge 2 is relieved of the load and consequently does not deform further.

Figure 2A:
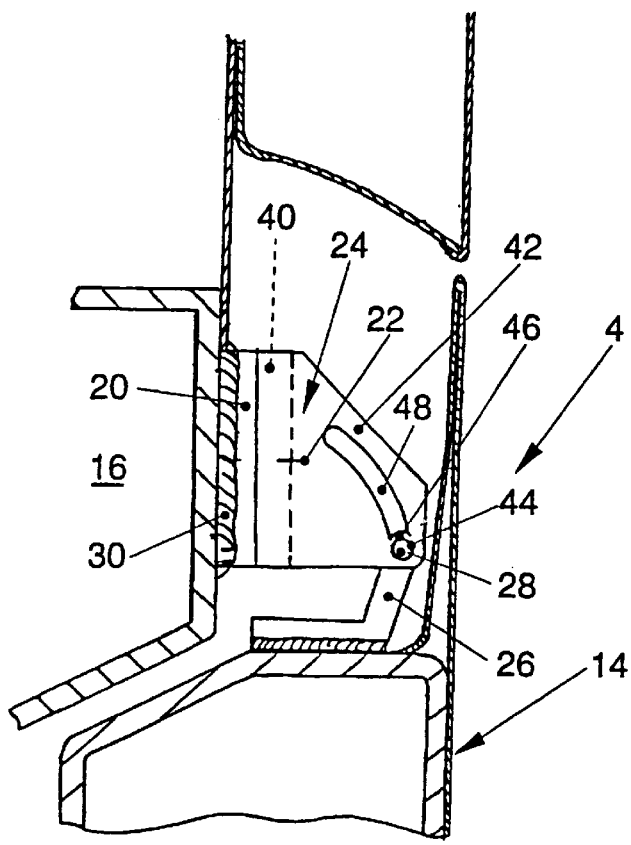
FIG. 2a is a partial cutaway top view showing another representative embodiment of a door hinge arranged in accordance with the invention.
Figure 2B:
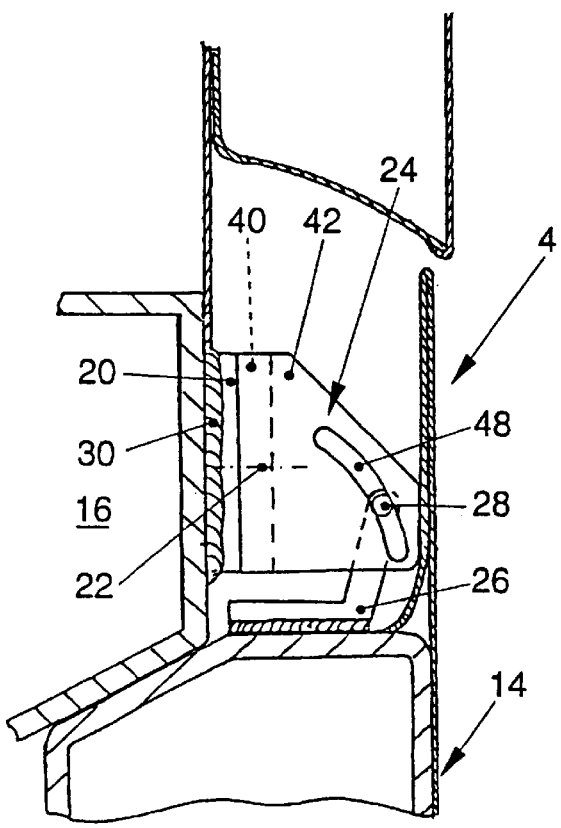
FIG. 2b is a partial cutaway top view of the door hinge of FIG. 2a after deformation of the attachment of the door hinge at the door pillar.

In another embodiment of a door hinge 4 in accordance with the invention shown in FIGS. 2a and 2b, the hinge retaining part 20, which is welded to the door pillar 16 parallel to the longitudinal center offset line of the vehicle is a flat plate to which the hinge part 24 that is fixed to the body is mounted by offset screws as schematically shown in the drawings. The hinge part 24, which has a U-shaped cross-section open toward the outside, consists of a flat yoke 40 that abuts the hinge retaining part 20 and has a hole for the screw 22 and two flat horizontal side plates 42 which project outwardly from the top and bottom ends of the yoke 40. Both of the side plates 42 have a hinge pin hole 44 in the vicinity of their outer edges to receive the hinge pin 28, which also passes through a cylindrical receptacle in the hinge part 26 that is fixed to the door between the side plates 42. The aligned holes 44 in the top and bottom side plates 42 are each separated by a narrow bridge 46 in the form of a web from corresponding slot guides 48 in the side plates 42, the slot guides being vertically aligned and curved inwardly toward the door pillar 16 so that they extend in the forward direction toward the longitudinal center line of the vehicle. The material bridges 46 constitute intended break points that yield first in the case of deformation of the door hinge 4 caused by an impact so that the top and bottom ends of the hinge pin 28 enter the slot guides 48 and move forwardly and inwardly therein, as shown in FIG. 2b. As a result, the hinge part 26 that is fixed to the door and the front end of the door 14 are pulled somewhat inwardly so that the adjacent angled surfaces 32 and 34 come into contact earlier.

In the further embodiment of a door hinge 6 shown in FIG. 3, deformation of the door pillar under load is used to stabilize the door in the door opening. In contrast to the conventional door hinge 18 of FIG. 6a, however, the angular hinge retaining part 20 is oriented in such a way that the flange 36 welded to the door pillar 16 extends toward the rear so that the hinge pin 28 is located essentially in line laterally with the front end of the weld seam 30 which then forms the axis of rotation about which the hinge pin 28 is pivoted when deformation of the door pillar occurs. This means that the hinge pin 28, and thus the front end of the door 14, is accelerated in the direction of the arrow M in FIG. 3 and thus moves when the weld seam 30 tears open inwardly toward of the vehicle's longitudinal center line until the adjacent surfaces 32 and 34 come into contact shortly thereafter.

In the embodiment of a door hinge 8 shown in FIG. 4, the hinge pin 28 is likewise located essentially in line laterally with the front end of the weld seam 30 so that, when deformation of the door pillar 16 occurs, the hinge pin swings in the direction of the arrow M and pulls the front end of the door 14 inwardly. Placement of the hinge pin 28 laterally in line with the front end of the weld seam 30 can be achieved in this case because the flange 36 of the angular hinge retaining part 20 is welded to a surface of the door pillar 16 which is inclined at a forward angle toward the longitudinal center line.

While the movement of the front end of the door in the direction of travel toward the vehicle's longitudinal center line is accomplished as a result of a deformation of the door hinge 2 (FIG. 1a) or 4 (FIG. 2a) itself or of an attachment of the door hinge 6 (FIG. 3) or 8 (FIG. 4) in the exemplary embodiments described above because of the design of the door hinge or its attachment, in the exemplary embodiment shown in FIG. 5, this movement is accomplished by a guide mechanism 12 which is separate and independent of a door hinge 10. This guide mechanism 12 includes a tongue 52 that is bent forward out of the door 14 and is located between the upper and lower door hinges 10, which are of conventional design and are disposed vertically one above the other. The tongue 52 is punched out of a front door strut 54 of the door 14 and, when the door 14 is closed, the tongue extends through a recess 56 into the inside of the door pillar 16 and behind the hinge-side wall of the door pillar 16 so that it prevents the front end of the door 14 from swinging out to the side when the door hinge 10 is destroyed. In order to additionally pull the front end of the door 14 in the direction of the longitudinal center line so that the adjacent surfaces 32 and 34 come into contact more quickly, a strap 60 punched out on three sides during manufacture of the recess 56 in the door pillar 16 is bent through the recess 56 into the inside of the door pillar 16 so that it forms a guide surface 62 extending inward at an angle for the tongue 52 which projects out of the door strut 54. In order to keep the strap 60 in its position despite the forces acting on it during deformation of the door hinge 10, the strap is supported against the inside of the door pillar 16 by two or more punched and bent angular projections 64.

The tongue 52 is bent in the shape of a semicircular arc with its forward face 66 in the direction of travel positioned opposite a base section 68 of the strap 60, which likewise has the shape of a semi circular arc but with a smaller radius of curvature so that when the door hinge 10 is destroyed the two form an auxiliary hinge that permits the door 14 to be opened.

Instead of a tongue 52 punched out of the door strut 54, the guide mechanism can alternatively be, for example, a massive spike (not shown), which is welded to the door strut 54 and, like the tongue 52 extends into a recess 56 of the door pillar 16 so that it does not hinder opening and closing of the door 14. The front end of the spike can have the shape of a truncated cone in order to cause the spike and the front end of the door 14 to move inwardly upon impact by interaction with the angled guide surface 62 of the door pillar 16. A guide arrangement of this or a similar type can be used together with conventional door hinges 18 as well as in conjunction with the door hinges 2, 4, 6 and 8 shown in FIGS. 1–5.

Alternatively, the tongue 52, the spike, or another element projecting past the front end of the door 14, can be made shorter so that it first engages with and moves behind the inner surface of the door pillar 16 to prevent the front end of the door 14 from swinging outwardly upon deformation of the door hinge 10 or its attachment and during the resultant forward motion of the door 14.

Although the invention has been described herein with reference to specific embodiments, many modifications and variations therein will readily occur to those skilled in the art. Accordingly, all such variations and modifications are included within the intended scope of the invention.

We claim:

1. A motor vehicle having a safety body structure arrangement comprising a motor vehicle having door pillars associated with a safety body structure and corresponding side doors each attached to a door pillar by at least one door hinge with a hinge pin, each of the doors being arranged to transmit, in the case of a collision, impact forces imparted to a door pillar from a front part of the safety body structure to regions of the vehicle body more distant than the door from an impact point if the door remains closed and bears against the adjacent door pillar in the region of the door hinge without swinging outwardly, each door hinge having an associated intended deformation point arranged to prevent, upon deformation in the event of a collision, displacement of a hinge pin and a front part of the door connected to the hinge pin away from a longitudinal center line of the motor vehicle, wherein the intended deformation point comprises a hinge part rigidly connected to the door pillar which has a region of reduced cross section.

2. A motor vehicle having a safety body structure arrangement comprising a motor vehicle having door pillars associated with a safety body structure and corresponding side doors each attached to a door pillar by at least one door hinge with a hinge pin, each of the doors being arranged to transmit, in the case of a collision, impact forces imparted to a door pillar from a front part of the safety body structure to regions of the vehicle body more distant than the door from an impact point if the door remains closed and bears against the adjacent door pillar in the region of the door hinge without swinging outwardly, each door hinge having an associated intended deformation point arranged to prevent, upon deformation in the event of a collision, displacement of a hinge pin and a front part of the door connected to the hinge pin away from a longitudinal center line of the motor vehicle, wherein the intended deformation point comprises a hinge part rigidly connected to the door pillar which has at least one of region of reduced cross-section and a region of weakened material located in an inside corner of an angular part having one flange welded to the door pillar and another flange projecting outwardly.

3. A motor vehicle in accordance with claim 1 wherein the intended deformation point is located adjacent to a weld seam between the door pillar and a hinge part that is welded to the door pillar.

* * * * *